(12) United States Patent
Yamada

(10) Patent No.: US 9,354,706 B2
(45) Date of Patent: May 31, 2016

(54) STORAGE MEDIUM HAVING STORED THEREIN INFORMATION PROCESSING PROGRAM, INFORMATION PROCESSING APPARATUS, INFORMATION PROCESSING SYSTEM, AND METHOD OF CALCULATING DESIGNATED POSITION

(71) Applicant: NINTENDO CO., LTD., Kyoto (JP)

(72) Inventor: Naoya Yamada, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 231 days.

(21) Appl. No.: 14/073,251

(22) Filed: Nov. 6, 2013

(65) Prior Publication Data
US 2014/0375546 A1  Dec. 25, 2014

(30) Foreign Application Priority Data
Jun. 21, 2013  (JP) ................................ 2013-130460

(51) Int. Cl.
*G06F 3/01*  (2006.01)
*G06F 3/03*  (2006.01)
*G06F 3/0346*  (2013.01)

(52) U.S. Cl.
CPC .............. *G06F 3/017* (2013.01); *G06F 3/0325* (2013.01); *G06F 3/0346* (2013.01)

(58) Field of Classification Search
CPC .................. G06F 3/017; G06F 3/0346; G06F 2200/1637; G06F 3/011; G06F 3/012; G06F 3/013; G06F 3/014; G06F 3/016; G06F 2203/013; G06F 2203/014; G06F 2203/015
See application file for complete search history.

(56) References Cited

U.S. PATENT DOCUMENTS

| | | | |
|---|---|---|---|
| 6,611,141 B1 * | 8/2003 | Schulz et al. | 324/226 |
| 2005/0212754 A1 | 9/2005 | Marvit | |
| 2006/0169021 A1 | 8/2006 | Silverstein | |
| 2007/0060228 A1 | 3/2007 | Abasaka et al. | |
| 2008/0068336 A1 * | 3/2008 | Choi et al. | 345/158 |
| 2008/0204406 A1 | 8/2008 | Ueno | |

(Continued)

FOREIGN PATENT DOCUMENTS

| | | |
|---|---|---|
| EP | 1 839 714 | 10/2007 |
| EP | 1 961 465 | 8/2008 |
| JP | 2007-61489 | 3/2007 |

OTHER PUBLICATIONS

U.S. Appl. No. 13/958,866, in the name of Ryoma Aoki, filed Aug. 5, 2013.

(Continued)

*Primary Examiner* — Premal Patel
(74) *Attorney, Agent, or Firm* — Nixon & Vanderhye P.C.

(57) ABSTRACT

An example of an information processing apparatus calculates a first position using imaging information based on an image captured by an imaging device. The information processing apparatus calculates a second position using a detection result of a sensor. The information processing apparatus repeatedly determines whether or not a predetermined condition is satisfied, the predetermined condition including a condition regarding a relationship between the first position and the second position. A designated position on a predetermined plane is calculated using the first position and/or the second position. In a satisfaction period after the predetermined condition has been satisfied, the information processing apparatus calculates the designated position by making an influence of the second position relatively great as compared to an unsatisfaction period before the predetermined condition is satisfied.

19 Claims, 6 Drawing Sheets

(56) References Cited

U.S. PATENT DOCUMENTS

2008/0285805 A1* 11/2008 Luinge et al. ............... 382/107
2011/0086708 A1* 4/2011 Zalewski et al. ............ 463/36
2013/0064427 A1* 3/2013 Picard et al. ................ 382/103
2013/0181892 A1* 7/2013 Liimatainen et al. ....... 345/156
2014/0062881 A1* 3/2014 Solomon et al. ............ 345/158

OTHER PUBLICATIONS

Extended European Search Report dated Mar. 20, 2015 issued in European Application No. 13178484.5 (6 pgs.).

Office Action dated Nov. 6, 2015 issued in co-pending U.S. Appl. No. 13/958,866.

* cited by examiner

F I G. 1
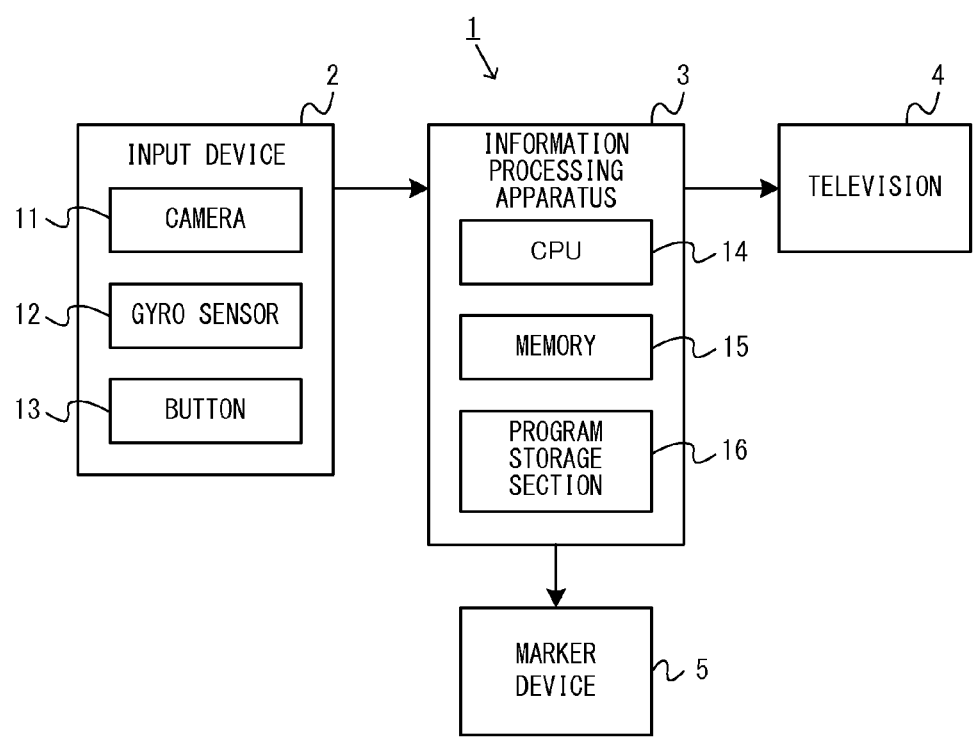

STORAGE MEDIUM HAVING STORED THEREIN INFORMATION PROCESSING PROGRAM, INFORMATION PROCESSING APPARATUS, INFORMATION PROCESSING SYSTEM, AND METHOD OF CALCULATING DESIGNATED POSITION

CROSS REFERENCE TO RELATED APPLICATION

The disclosure of Japanese Patent Application No. 2013-130460, filed on Jun. 21, 2013, is incorporated herein by reference.

FIELD

The technique shown here relates to an storage medium having stored thereon an information processing program, an information processing system, an information processing apparatus, and a method of calculating a designated position, which are used to calculate a designated position based on an input provided to an input member (input device).

BACKGROUND AND SUMMARY

Conventionally, there has been an information processing system in which an input is performed by an operation of moving an input device. For example, in a conventional game system, a camera is provided in a controller held by a user, and an image of a marker arranged in the vicinity of a television is captured by the camera. The game system calculates a two-dimensional vector based on the image captured by the camera, and moves an operation target displayed on the monitor based on the two-dimensional vector.

In the method of capturing an image of a marker with a camera, however, a user can move the input device only in a range where the marker is included in the imaging range (field-of-view range) of the camera, and thus the range where the user can move the input device is limited.

Therefore, the present application discloses a storage medium having stored thereon an information processing program, an information processing system, an information processing apparatus, and a method of calculating a designated position, which can improve the operability of an input operation of moving an input member.

(1)

An example of a storage medium according to the present specification is a non-transitory computer-readable storage medium having stored therein an information processing program to be executed by a computer of an information processing apparatus for calculating a designated position based on an input provided to an input member. The information processing program causes the computer to execute: calculating a first position; calculating a second position; making a determination; and calculating a designated position.

The computer calculates a first position using imaging information based on an image captured by an imaging device that is provided in the input member or captures the input member, the first position being a position on a predetermined plane and changing in accordance at least with an attitude of the input member.

The computer calculates a second position using a detection result of a sensor, the detection result enabling a calculation of the attitude of the input member, the second position being a position on the plane and according to the attitude of the input member.

The computer repeatedly determines whether or not a predetermined condition is satisfied, the predetermined condition including a condition regarding a relationship between the first position and the second position.

The computer calculates a designated position on the plane using the first position and/or the second position.

Further, the computer, in a satisfaction period after the predetermined condition has been satisfied, calculates the designated position by making an influence of the second position relatively great as compared to an unsatisfaction period before the predetermined condition is satisfied.

The above "input member" may be an input device separated from the information processing apparatus, or may be integrated with the information processing apparatus.

Based on the above configuration (1), the designated position is calculated using the first position calculated from the imaging information, together with the second position calculated from the detection result of the sensor. Thus, for example, the designated position is calculated using the second position even when the first position is not calculated from the imaging information. Thus, a user can perform an input operation using the input member even when the input member is in an attitude that does not enable the calculation of the first position. This enables the user to perform an input operation by moving the input member more freely, and therefore makes it possible to improve the operability of the input operation of moving the input member.

In addition, based on the above configuration (1), in the unsatisfaction period, the designated position is calculated by making the influence of the first position relatively great. That is, at an early stage where the calculation of the designated position has been started, the influence of the first position may be made relatively great, whereby it is possible to improve the accuracy of the designated position.

(2)

The predetermined condition may include a condition regarding a distance between the first position and the second position.

Based on the above configuration (2), the use of the above distance makes it possible to easily determine whether or not, as a value according to the attitude of the input member, the second position has been calculated with as high accuracy as the first position. This makes it possible to easily determine the switching from the unsatisfaction period to the satisfaction period.

(3)

The condition regarding the distance may be a condition that the distance between the first position and the second position becomes equal to or smaller than a predetermined value.

Based on the above configuration (3), the switching from the unsatisfaction period to the satisfaction period is performed at timing when the difference between the first position and the second position is small. The switching may be performed at such timing, whereby it is possible to reduce the possibility that the designated position based on these positions rapidly changes before and after the switching. This reduces the possibility of giving the user discomfort when the switching is performed. This makes it possible to improve the operability of the input operation.

(4)

The computer may repeatedly determine whether or not a sub-condition regarding the relationship between the first position and the second position is satisfied. In this case, when the sub-condition is satisfied predetermined multiple times, the computer may determine that the predetermined condition is satisfied.

Based on the above configuration (4), even when the sub-condition has been accidentally satisfied only once, it is possible to prevent the switching from the unsatisfaction period to the satisfaction period. This makes it possible to improve the accuracy of the timing of the switching, and therefore possible to improve the operability of the input member.

(5)

The computer may repeatedly determine whether or not a sub-condition regarding the relationship between the first position and the second position is satisfied. In this case, when the sub-condition has been satisfied a predetermined number of times in succession, the computer may determine that the predetermined condition is satisfied.

Based on the above configuration (5), when the sub-condition has been satisfied a predetermined number of times in succession, the switching from the unsatisfaction period to the satisfaction period is performed. This makes it possible to further reduce the possibility that the designated position is calculated using the second position having low accuracy, and therefore possible to calculate the designated position with higher accuracy.

(6)

The predetermined condition may include a condition regarding a reliability of the detection result of the sensor.

Based on the above configuration (6), when the second position calculated from the detection result of the sensor has high accuracy, it is possible to calculate the designated position by increasing the degree of influence of the second position. This makes it possible to improve the accuracy of the calculation of the designated position, and therefore possible to improve the accuracy of the input operation.

(7)

The condition regarding the reliability may be a condition that a motion of the input member is gentler than a predetermined reference.

Based on the above configuration (7), the use of the intensity of the motion of the input member makes it possible to determine the reliability with high accuracy.

(8)

In the unsatisfaction period, the designated position may be calculated using the first position, and in the satisfaction period, the designated position may be calculated using the second position.

Based on the above configuration (8), in an early period in which the second position has low accuracy based on a guess, the designated position is calculated using the first position, which has relatively high accuracy based on a guess. Thus, it is possible to enable the input operation with high accuracy, and therefore possible to improve the operability of the input operation.

(9)

In the unsatisfaction period, the designated position may be calculated using the first position and without using the second position, and in the satisfaction period, the designated position may be calculated using the first position and the second position.

Based on the above configuration (9), in an early period in which the second position may have low accuracy, the use of only the first position makes it possible to calculate the designated position with high accuracy. In the satisfaction period, the use of two types of positions makes it possible to calculate the designated position with high accuracy.

(10)

The second position may be calculated based on the detection result of the sensor, and the calculated second position may be corrected by bringing the calculated second position close to the first position. In this case, it may be determined, using the corrected second position, whether or not the predetermined condition is satisfied. The designated position may be calculated using the corrected second position.

Based on the above configuration (10), it is possible to reduce the increase in the difference between the first position and the second position. Thus, it is possible to reduce the possibility that the designated position calculated based on these positions rapidly changes before and after the switching from the unsatisfaction period the satisfaction period. This reduces the possibility of giving the user discomfort when the switching is performed. This makes it possible to improve the operability of the input operation.

Further, when the above configuration (10) is combined with the above configuration (2) or (3), it is possible to make it likely that the first position and the second position come close to each other. This makes it likely that the timing at which the switching to the satisfaction period is performed is early. This enables the user to start earlier the input operation that allows the user to move the input member freely, and makes it possible to improve the operability of the input operation.

(11)

The first position and the second position before being corrected may be repeatedly calculated. In this case, every time the first position and the second position before being corrected are calculated, an amount of correction may be calculated in accordance with a difference between the first position and the second position before being corrected, and the second position before being corrected may be corrected by bringing the second position before being corrected close to the first position by the amount of correction.

Based on the above configuration (11), the use of the amount of correction based on the above difference makes it possible to easily make a correction to bring the second position before being corrected close to the first position.

(12)

If the second position is calculated when the first position is not calculated, the second position that has been currently calculated may be corrected using the amount of correction that has been calculated last.

Based on the above configuration (12), even when the first position is not calculated, the second position is corrected. Based on this, the second position is corrected regardless of whether or not the first position can be calculated. This makes it possible to prevent the second position from changing in accordance with whether or not the first position can be calculated. This makes it possible to reduce the possibility of giving the user discomfort, and therefore possible to improve the operability of the input operation.

(13)

The first position may be calculated using the imaging information obtained at predetermined timing. In this case, the second position may be calculated using the detection result of the sensor obtained at the same timing as the imaging information.

Based on the above configuration (13), it is possible to calculate two types of positions (the first position and the second position) based on the attitude of the input member so as to correspond to the attitude of the input member at substantially the same point in time. This makes it possible to calculate the designated position with high accuracy.

(14)

When the imaging device can capture a predetermined imaging target, the first position may be calculated based on a position of the imaging target in an image captured by the imaging device. In this case, the second position may be calculated based on the detection result of the sensor when the input member is in any attitude.

Based on the above configuration (14), the use of the imaging information makes it possible to calculate the designated position with high accuracy, and the use of the detection result of the sensor makes it possible to enable the input operation even when the first position is not calculated using the imaging information.

It is noted that the present specification discloses an information processing apparatus and an information processing system that execute processing equivalent to that achieved by executing the information processing program according to the above configurations (1) to (14). Further, the present specification discloses a method of calculating a designated position, the method performed in the above configurations (1) to (14).

In addition, an example of an information processing apparatus according to the present specification calculates a designated position on a predetermined plane based on an input provided to an input member. The information processing apparatus includes a first position calculation section, a second position calculation section, a determination section, and a designated position calculation section. The first position calculation section calculates a first position using imaging information based on an image captured by a camera that is provided in the input member or a camera that captures the input member, the first position being a position on the plane and changing in accordance at least with an attitude of the input member. The second position calculation section calculates a second position using a detection result of at least one of a gyro sensor, an acceleration sensor, and a magnetic sensor, the second position being a position on the plane on which the first position is calculated and according to the attitude of the input member. The determination section repeatedly determines whether or not a predetermined condition is satisfied, the predetermined condition including a condition that a distance between the first position and the second position is equal to or smaller than a predetermined distance continuously for a predetermined period. The designated position calculation section, when the predetermined condition is not satisfied, calculates a designated position on the plane using the first position and without using the second position, and after the predetermined condition has been satisfied, calculates the designated position on the plane using the second position.

Based on the storage medium having stored therein the information processing program, the information processing apparatus, the information processing system, and the method of calculating a designated position, it is possible to improve the operability of an input operation of moving an input member, by appropriately using a first position based on imaging information and a second position based on a detection result of a sensor.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 1 is a block diagram showing a non-limiting example of an information processing system according to an exemplary embodiment;

DETAILED DESCRIPTION OF NON-LIMITING EXAMPLE EMBODIMENTS

[1. Configuration of Information Processing System]

Figure 2:
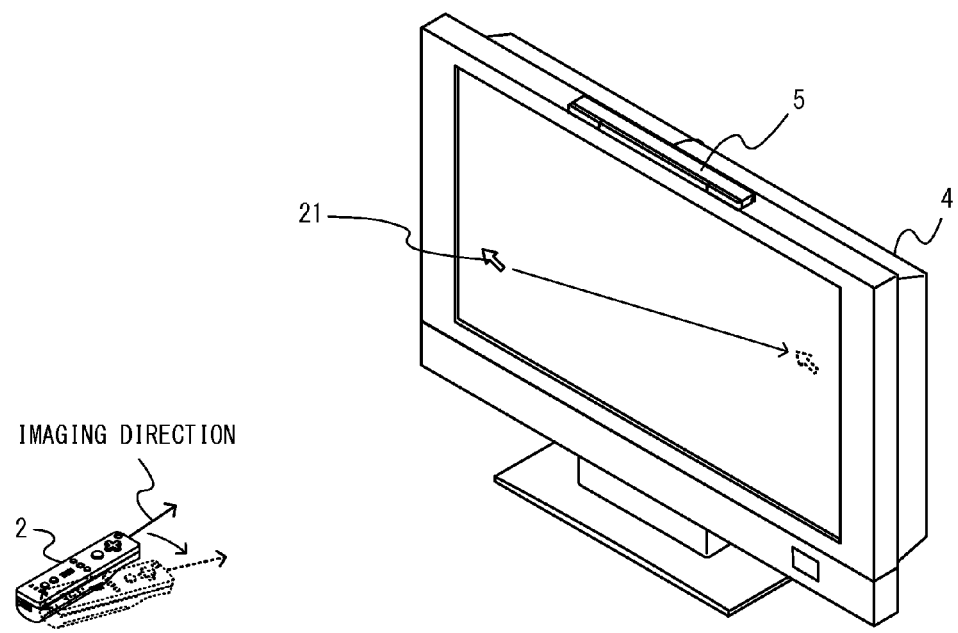
FIG. 2 is a diagram showing a non-limiting example of the arrangement of a television 4 and a marker device 5 in a case where an input device 2 is used.

Hereinafter, a storage medium having stored therein an information processing program, an information processing system, an information processing apparatus, and a method of calculating a designated position according to an example of an embodiment will be described. FIG. 1 is a block diagram showing an example of the information processing system according to an exemplary embodiment. In FIG. 1, the information processing system 1 includes an input device 2, an information processing apparatus 3, a television 4, and a marker device 5. The information processing system 1 according to the exemplary embodiment performs information processing in accordance with an operation of changing the attitude of the input device 2.

The information processing system 1 includes the input device (controller) 2, which is an example of an input member for a user to provide an input while holding it. In the exemplary embodiment, the input device 2 includes a camera 11, a gyro sensor 12, and a button 13.

The camera 11 is an example of imaging means (an imaging device). In the exemplary embodiment, the camera 11 is capable of capturing the marker device 5 described later (capable of detecting infrared light emitted from the marker device 5). Although details will be described later, when an image of the marker device 5 is captured by the camera 11, the position and/or the attitude of the input device 2 with respect to the marker device 5 can be estimated by using a result of the image-capturing.

The gyro sensor 12 detects angular velocities of the input device 2. In the exemplary embodiment, the gyro sensor 12 detects angular velocities around predetermined three axes. However, in another embodiment, the gyro sensor may detect an angular velocity around one axis or angular velocities around two axes. The input device 2 may optionally include a sensor (attitude sensor) whose detection result enables the calculation (estimation) of the attitude of the input device 2. For example, the input device 2 may include, in addition to (or instead of) the gyro sensor 12, an acceleration sensor and/or a magnetic sensor.

The button 13 is an example of an operation unit, which is operated by the user. In another exemplary embodiment, the input device 2 may include, in addition to (or instead of) the button 13, a stick that allows the input of a direction, a touch panel, a touch pad, and the like.

The input device 2 detects an operation performed by the user, and transmits operation data representing the user's operation to the information processing apparatus 3. In the exemplary embodiment, the operation data includes: imaging information obtained from the image captured by the camera 11; angular velocity information obtained by the gyro sensor 12; and depression information relating to the button 13. The imaging information is information relating to a captured image. In the exemplary embodiment, the imaging information is information indicating the position of the marker device 5 on the plane of the captured image. When the marker device 5 is not included in the captured image, the imaging information indicates that the marker device 5 is not included in the captured image. In the exemplary embodiment, the imaging information is generated from the captured image by a processing section included in the input device 2. In another embodiment, data of the captured image itself may be included in the operation data as the imaging information. The angular velocity information indicates the angular velocities detected by the gyro sensor 12. The depression information indicates whether or not the button 13 is pressed.

The information processing system 1 includes the information processing apparatus 3. The information processing apparatus 3 performs information processing (a designated position calculation process described later) to be performed in the information processing system 1. The information processing apparatus 3 may be an information processing apparatus in any form such as a personal computer, a game apparatus, a handheld terminal, a smart phone, or the like. The information processing apparatus 3 is able to communicate with the input device 2 and the television 4. It is noted that the communication between the information processing apparatus 3 and the input device 2 or the television 4 may be performed via a wire or wirelessly.

As shown in FIG. 1, the information processing apparatus 3 includes a CPU 14, a memory 15, and a program storage section 16. The CPU 14 performs the above-mentioned information processing by executing a predetermined information processing program by using the memory 15. Although details will be described later, the information processing in the exemplary embodiment is a designated position calculation process for calculating a designated position based on the operation data. It is noted that the designated position is a position on a screen of the television 4 operated by the user. The information processing apparatus 3 may be of any structure that can execute the information processing. For example, a part or all of the information processing may be executed by a dedicated circuit. In the exemplary embodiment, the information processing apparatus 3 generates an image by performing the information processing, and the generated image is output from the information processing apparatus 3 to the television 4.

The program storage section 16 stores therein the information processing program. The program storage section 16 is any storage device to which the CPU 14 is accessible. The program storage section 16 may be a storage section included in the information processing apparatus 3, such as a hard disk, or may be a storage section attachable to and detachable from the information processing apparatus 3, such as an optical disk.

The television 4 is an example of a display device for displaying an image. When an image is transmitted from the information processing apparatus 3 to the television 4, the television 4 displays this image.

The marker device 5 functions as an imaging target for the camera 11. For example, the marker device 5 is installed on the periphery of the television 4 (see FIG. 2). In the exemplary embodiment, the marker device 5 includes one or more light emitting elements (e.g., LEDs) each emitting infrared light. In the exemplary embodiment, the marker device 5 is connected to the information processing apparatus 3, and light emission of each light emitting element is controlled by the information processing apparatus 3.

In the information processing system 1, the information processing apparatus 3 performs the information processing in accordance with an input performed on the input device 2, and an image obtained as a result of the information processing is displayed on the television 4. As described above, in the exemplary embodiment, the information processing system 1 is configured such that an input function, an information processing function, and a display function are realized by a plurality of apparatuses. In another embodiment, a plurality of functions among these functions may be realized by a single information processing apparatus. For example, the information processing system 1 may include a single information processing apparatus (e.g., a handheld information processing terminal or the like) having an input function and an information processing function, instead of the input device 2 and the information processing apparatus 3, respectively.

Further, in another embodiment, the function of the information processing apparatus 3 may be realized by a plurality of apparatuses. For example, in another embodiment, at least a part of the information processing performed by the information processing apparatus 3 may be distributed to and performed by a plurality of apparatuses that are able to perform communication via a network (a wide-area network and/or a local network).

[2. Designated Position Calculation Process in Information Processing System 1]

Next, the designated position calculation process performed in the information processing system 1 will be described. It is noted that the designated position calculation process is described below taking as an example a case where a cursor (pointer) is displayed at the designated position on the screen of the television 4, and the user performs an operation of moving the cursor using the input device 2.

(2-1: Outline of Operation Using Input Device)

FIG. 2 is a diagram showing an example of the arrangement of the television 4 and the marker device 5 in a case where the input device 2 is used. As shown in FIG. 2, in the exemplary embodiment, the user installs the marker device 5 on the periphery of the television 4 (in FIG. 2, on the television 4), and uses the input device 2 with the imaging direction of the camera 11 basically facing the television 4 (the marker device 5). The user in this state changes the attitude of the input device 2 to perform various operations. However, the input device 2 does not always need to be used in the state where it faces the television 4, and may be used in the state where it faces a direction off the television 4 (see "2-3: Calculation of designated position" described later).

As shown in FIG. 2, in the exemplary embodiment, the user can perform an operation of moving a cursor 21 using the input device 2. Although details will be described later, the designated position is calculated based on the attitude of the input device 2, and the cursor 21 is displayed at the calculated designated position. That is, the cursor 21 is displayed at a position according to the attitude of the input device 2.

(2-2: Camera Coordinates and Sensor Coordinates)

Next, a description will be given of coordinate values (camera coordinates and sensor coordinates) which are calculated from the operation data of the input device 2, and used to calculate the designated position. In the exemplary embodiment, the information processing system 1 calculates, from the operation data, coordinate values in accordance with the attitude of the input device 2, and calculates the designated position based on the calculated coordinate values. It is noted that each coordinate value indicates a position on a virtual plane corresponding to the screen of the television 4 (see FIG. 3). That is, the information processing system 1 calculates a position according to the attitude of the input device 2 on the plane.

The information processing system 1 calculates the coordinate values according to the attitude of the input device 2, based on the output information (the above-mentioned imaging information) from the camera 11 and on the output information (the above-mentioned angular velocity information) from the gyro sensor 12. Hereinafter, the coordinates calculated based on the imaging information obtained from the camera 11 are referred to as "camera coordinates", and the coordinates calculated based on the angular velocity information obtained from the gyro sensor 12 are referred to as "sensor coordinates".

The camera coordinates are calculated based on the imaging information. As described above, the imaging information is information indicating the position of the marker device 5 on the plane of the captured image. Since the position indicated by the imaging information changes by changing the attitude of the input device 2, it is possible to calculate the camera coordinates according to the attitude of the input device 2, based on the imaging information. It is noted that in the present specification, "a value (coordinates) according to the attitude" means a value (coordinates) that changes in accordance at least with the attitude of the input device 2, but does not need to be a value corresponding to the attitude of the input device 2 on a one-to-one basis. Although the method of calculating the camera coordinates from the imaging information is any method, the camera coordinates can be calculated by a method disclosed in Japanese Laid-Open Patent Publication No. 2007-61489, for example.

The sensor coordinates are calculated based on the angular velocity information. Since the angular velocity information indicates the angular velocity of the input device 2, it is possible to calculate the sensor coordinates according to the attitude of the input device 2, based on the angular velocity information. The method of calculating the sensor coordinates from the angular velocity information is any method. In the exemplary embodiment, to calculate the attitude of the input device 2 with high accuracy, the information processing system 1 calculates the attitude of the input device 2 using the imaging information and the detection result of an acceleration sensor (not shown) in addition to the angular velocity information. Details of the method of calculating the sensor coordinates are described below.

In the exemplary embodiment, first, the information processing system 1 calculates the attitude of the input device 2 based on the angular velocity information. It is possible to calculate this attitude (the attitude based on the angular velocity information) by calculating from the angular velocity information the angle of rotation (tilt) of the input device 2 from a reference attitude set by a predetermined method.

Next, the information processing system 1 corrects the attitude based on the angular velocity using the detection result of the acceleration sensor. Specifically, the information processing system 1 calculates from the detection result of the acceleration sensor the tilt (the tilt in the pitch direction) of the input device 2 with respect to the direction of gravity, and corrects the attitude based on the angular velocity information using the calculated tilt. In the exemplary embodiment, this correction is made by bringing the attitude based on the angular velocity close to the attitude corresponding to the tilt calculated from the detection result of the acceleration sensor.

Next, the information processing system 1 corrects the attitude based on the angular velocity (the attitude corrected using the detection result of the acceleration sensor in the exemplary embodiment) using the imaging information. Specifically, the information processing system 1 calculates from the imaging information the tilt (the tilt in the yaw direction) of the input device 2 with respect to the horizontal direction, and corrects the attitude based on the angular velocity information using the calculated tilt. In the exemplary embodiment, this correction is made by bringing the attitude based on the angular velocity close to the attitude corresponding to the tilt calculated from the imaging information.

It is noted that either of the correction process using the detection result of the acceleration sensor and the correction process using the imaging information may be performed first. Alternatively, in another exemplary embodiment, only either of the correction process using the detection result of the acceleration sensor and the correction process using the imaging information may be performed. Yet alternatively, in another exemplary embodiment, the correction processes may not be performed.

The information processing system 1 calculates the sensor coordinates based on the attitude corrected as described above. In the exemplary embodiment, the information processing system 1 calculates the angles of rotation of the input device 2 in the yaw direction and the pitch direction from the attitude at the origin, and multiplies the calculated angles of rotation by a predetermined constant, thereby calculating the sensor coordinates. It is noted that the attitude at the origin is the attitude of the input device 2 when the sensor coordinates correspond to the position of the origin on the xy plane.

It is noted that the information processing system 1 performs, as the process of calculating the attitude of the input device 2, the process of calculating the attitude based on the angular velocity information, the correction process using the detection result of the acceleration sensor, and the correction process using the imaging information. Then, the information processing system 1 repeatedly performs this attitude calculation process. Further, the information processing system 1 calculates the sensor coordinates every time the attitude of the input device 2 is calculated by the attitude calculation process.

Here, the attitude based on the angular velocity information is calculated without considering the positional relationship with the marker device 5. Further, in the above correction processes, corrections are gradually made in order, for example, to reduce the discomfort to be given to the user due to a rapid change in the attitude of the input device 2. Thus, at an early stage where the calculation of the sensor coordinates has been started, the sensor coordinates based on the attitude of the input device 2 may have values significantly different from those of the camera coordinates, and may have low accuracy (in the sense of being significantly different from the camera coordinates). In response, in the exemplary embodiment, the attitude calculation process is repeatedly performed, whereby the correction processes are repeatedly performed. Thus, the calculations of the attitude of the input device 2 and the sensor coordinates gradually become more accurate. In the exemplary embodiment, the sensor coordinates may thus have low accuracy at first, but the calculation of the sensor coordinates gradually becomes more accurate.

It is noted that although details will be described later, in the exemplary embodiment, the information processing system 1 corrects the sensor coordinates calculated as described above, using the camera coordinates, thereby calculating the ultimate sensor coordinates (that is, the sensor coordinates to be used to calculate the designated position). It is noted that in another exemplary embodiment, the correction process using the camera coordinates may not need to be performed.

In addition, in the exemplary embodiment, camera coordinates Pc and sensor coordinates Ps are calculated at the same timing. That is, the information processing system 1 obtains the operation data from the input device 2 once every predetermined time, and calculates the camera coordinates Pc and the sensor coordinates Ps using the obtained operation data. That is, the camera coordinates Pc are calculated based on the imaging information included in the operation data, and the sensor coordinates Ps are calculated based on the angular velocity information included in the same operation data. The camera coordinates Pc and the sensor coordinates Ps are calculated using information included in the same operation data, and therefore, the camera coordinates Pc and the sensor coordinates Ps are values according to the attitude of the input device 2 at substantially the same point in time.

As described above, the information processing system 1 calculates the camera coordinates Pc using the imaging information obtained at predetermined timing, and calculates the sensor coordinates Ps using the detection result of the gyro sensor 12 obtained at the same timing as that of the imaging information. This makes it possible to calculate two types of sets of coordinate values according to the attitude of the input device 2 so as to correspond to the attitude of the input device 2 at substantially the same point in time. This makes it possible to calculate the designated position with high accuracy.

Figure 3:
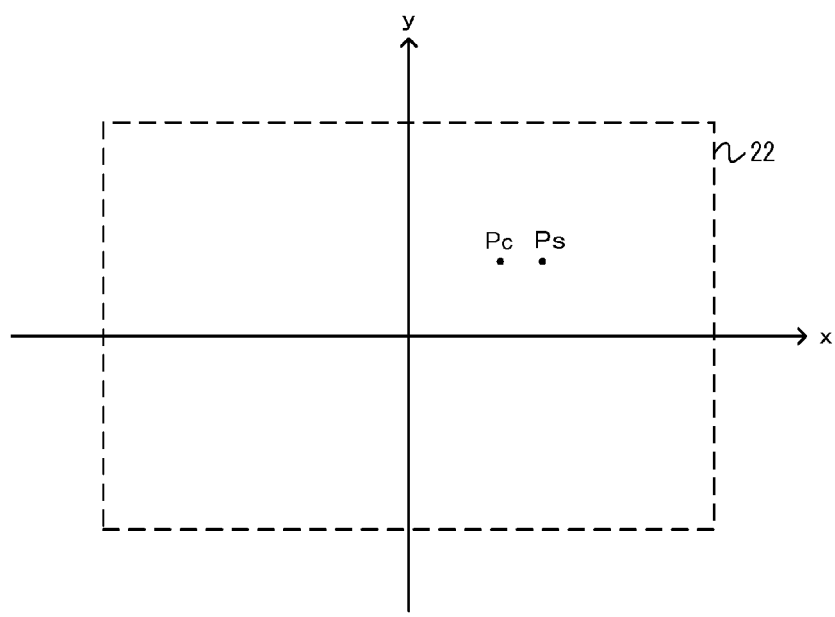
FIG. 3 is a diagram showing non-limiting examples of camera coordinates and sensor coordinates on a plane.

FIG. 3 is a diagram showing examples of the camera coordinates and the sensor coordinates on a plane. As shown in FIG. 3, in the exemplary embodiment, as a coordinate system representing positions on the plane, an xy coordinate system is set. The xy coordinate system is set such that a position corresponding to the center of the screen is the origin, an axis corresponding to the horizontal direction of the screen is an x-axis, and an axis corresponding to the vertical direction of the screen is a y-axis. FIG. 3 shows the camera coordinates Pc and the sensor coordinates Ps in a case where the input device 2 takes a certain attitude. The camera coordinates Pc and the sensor coordinates Ps are calculated by different methods using different sensors. Therefore, even with the same attitude of the input device 2 (even if the camera coordinates Pc and the sensor coordinates Ps are calculated based on information obtained at the same timing), the camera coordinates Pc and the sensor coordinates Ps can take different values as shown in FIG. 3.

A dotted line area 22 shown in FIG. 3 is an area corresponding to the screen of the television 4 on a plane. In FIG. 3, the camera coordinates Pc and the sensor coordinates Ps each indicate a position within the area 22, but may indicate a position outside the area 22 (i.e., outside the screen). That is, since the gyro sensor 12 is able to calculate the attitude of the input device 2 regardless of the positional relationship between the input device 2 and the television 4, the information processing system 1 can calculate the sensor coordinates indicating a position outside the screen. In addition, basically, the camera coordinates can be calculated when the camera coordinates are within the area 22 (i.e., when the camera 11 faces the television 4). However, camera coordinates indicating a position outside the area 22 can be calculated as long as the marker device 5 is included in the imaging range of the camera 11.

(2-3: Calculation of Designated Position)

Next, the method of calculating the designated position based on the camera coordinates and the sensor coordinates is described. In the exemplary embodiment, at the start of the designated position calculation process, the designated position is calculated using the camera coordinates. Then, in accordance with the satisfaction of a predetermined determination condition (described later), the coordinates to be used to calculate the designated position are switched from the camera coordinates to the sensor coordinates. Details of the calculation of the designated position are described below.

Figure 4:
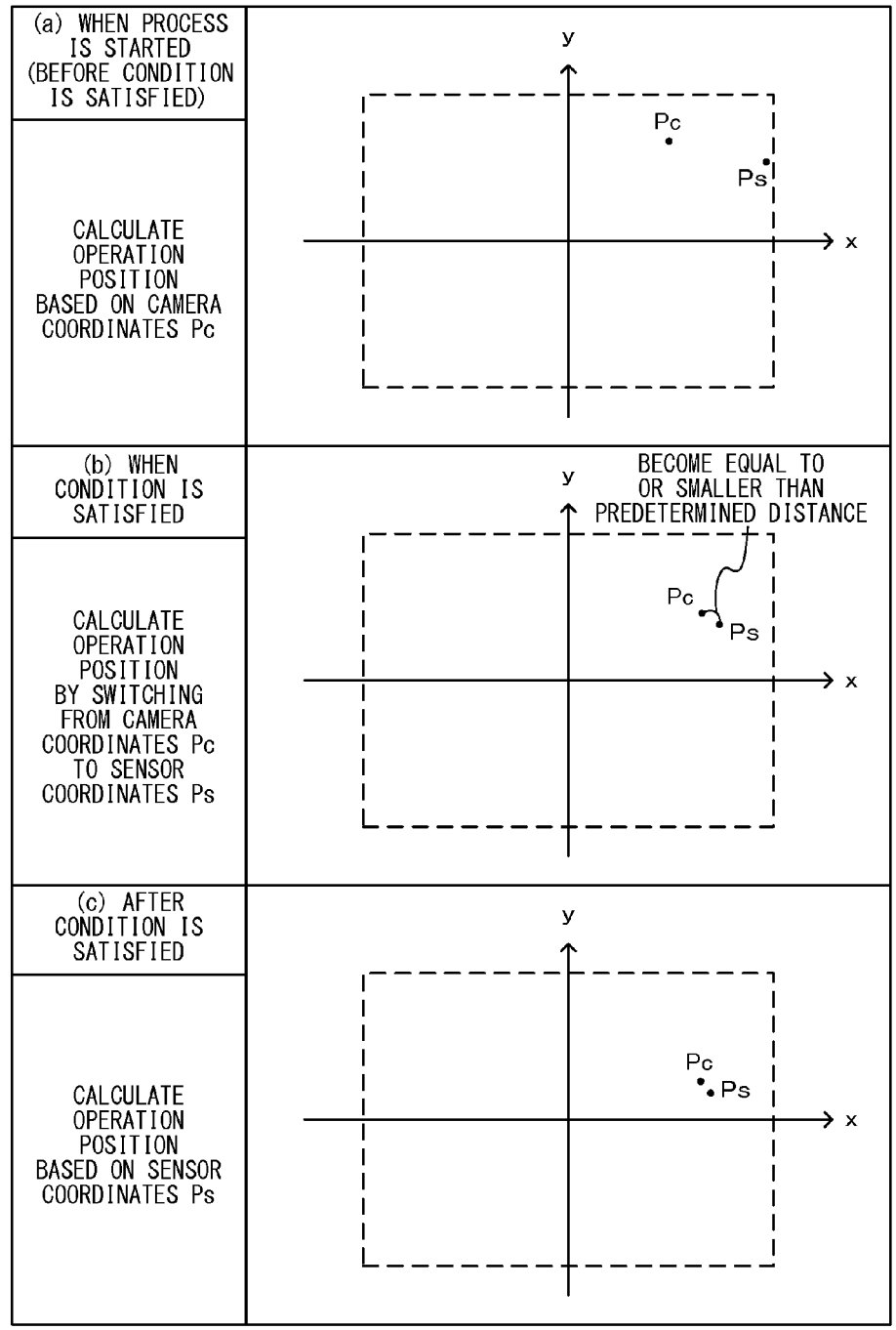
FIG. 4 is a diagram showing a non-limiting example of a method of calculating a designated position.

FIG. 4 is a diagram showing an example of the method of calculating the designated position. As shown in (a) of FIG. 4, in the period from the start of the process of calculating the designated position to the satisfaction of a determination condition (hereinafter referred to as an "unsatisfaction period"), the information processing system 1 calculates the designated position based on the camera coordinates Pc. Although a specific method of calculating the designated position is any method, in the exemplary embodiment, the position of the camera coordinates Pc is used as it is as the designated position.

It is noted that during the process of calculating the designated position, the information processing system 1 calculates both the camera coordinates Pc and the sensor coordinates Ps. That is, the sensor coordinates Ps are calculated even in the unsatisfaction period. Further, the camera coordinates Pc are calculated even in a satisfaction period described later.

Having calculated the camera coordinates Pc and the sensor coordinates Ps, the information processing system 1 determines whether or not a predetermined determination condition is satisfied. The determination condition is a condition regarding the relationship between the camera coordinates Pc and the sensor coordinates Ps. Although the determination condition according to the exemplary embodiment will be described later, the determination condition includes the condition that "the camera coordinates Pc and the sensor coordinates Ps are within a predetermined distance from each other". It is noted that the information processing system 1 repeatedly makes the above determination every time the camera coordinates Pc and the sensor coordinates Ps are calculated.

When the determination condition is satisfied, the information processing system 1 switches the coordinates to be used to calculate the designated position from the camera coordinates Pc to the sensor coordinates Ps. Thus, in the exemplary embodiment, as shown in (b) of FIG. 4, the camera coordinates Pc are switched to the sensor coordinates Ps (at least) under the condition that the distance between the camera coordinates Pc and the sensor coordinates Ps has become equal to or smaller than the predetermined distance.

In the exemplary embodiment, as shown in (c) of FIG. 4, in the period after the satisfaction of the determination condition (hereinafter referred to as a "satisfaction period"), the information processing system 1 calculates the designated position based on the sensor coordinates Ps. Although a specific method of calculating the designated position is any method, in the exemplary embodiment, the position of the sensor coordinates Ps is used as it is as the designated position. It is noted that in the exemplary embodiment, the satisfaction period does not return to the unsatisfaction period after the unsatisfaction period has switched to the satisfaction period. In another exemplary embodiment, however, when a predetermined condition has been satisfied (for example, an operation using a cursor has been ended), the satisfaction period may return to the unsatisfaction period.

As described above, in the exemplary embodiment, the designated position is calculated using the sensor coordinates Ps (in the satisfaction period). Thus, the user can perform an input operation by moving the input device 2 by an amount larger than that in a case where the designated position is calculated using only the camera coordinates Pc. That is, in the exemplary embodiment, it is possible to perform an input operation by moving the input device 2 more freely, and therefore possible to improve the operability of the input operation of moving the input device 2.

Here, in the exemplary embodiment, as described above, the sensor coordinates Ps gradually become more accurate, but may have low accuracy at first. Further, not only in the method of calculating the sensor coordinates Ps in the exemplary embodiment, but also in a method of calculating a value (for example, the sensor coordinates) according to the attitude of the input device 2 using a sensor, such as a gyro sensor, an acceleration sensor, or a magnetic sensor, whose detected value enables the calculation of the attitude of the input device 2, it may be difficult to calculate the value with high accuracy in an early period in which the calculation of the value has been started. For example, in the case of using a gyro sensor, to calculate the value with high accuracy, an error due to a temperature drift that occurs in the gyro sensor is corrected. However, it may take time to obtain an appropriate amount of correction. Alternatively, to calculate the value with high accuracy, (as in the exemplary embodiment) a method may be employed of calculating the value, taking into account not only the latest detected value but also a detected value in the past. In this method, in the early period in which the calculation of the value has been started, the calculation result may not stabilize because, for example, a sufficient detected value cannot be obtained. Thus, it may be difficult to calculate the value according to the sensor with high accuracy. As described above, in the early period in which the calculation of the sensor coordinates Ps has been started, it may be difficult to calculate the sensor coordinates Ps with high accuracy.

Thus, in the exemplary embodiment, as described above, the information processing system 1 calculates the designated position using the camera coordinates Pc instead of the sensor coordinates Ps in the early period in which the calculation of the sensor coordinates Ps has been started (the unsatisfaction period). That is, in the unsatisfaction period, the designated position is calculated using the position of the camera coordinates Pc, and in the satisfaction period, the designated position is calculated using the position of the sensor coordinates Ps. Based on this, in the early period in which the sensor coordinates Ps may have low accuracy, the designated position is calculated using the camera coordinates Pc, which are considered to have relatively high accuracy. Thus, in the exemplary embodiment, the user can perform an input operation by moving the input device 2 freely, and it is also possible to enable the input operation with high accuracy.

More specifically, in the exemplary embodiment, in the unsatisfaction period, the designated position is calculated using the camera coordinates Pc and without using the sensor coordinates Ps. In the satisfaction period, the designated position is calculated using the camera coordinates Pc and the sensor coordinates Ps. This makes it possible to calculate the designated position with high accuracy using only the camera coordinates Pc in the early period in which the sensor coordinates Ps may have low accuracy, and also possible to calculate the designated position with high accuracy using two types of sets of coordinates in the satisfaction period.

In addition, in the exemplary embodiment, when the camera 11 can capture a predetermined imaging target (the marker device 5), the camera coordinates Pc are calculated based on the position of the imaging target in the image captured by the camera 11. On the other hand, the sensor coordinates Ps are calculated based on the detection result of the gyro sensor 12 when the input device 2 is in any attitude. Here, in the method of calculating coordinates (the camera coordinates Pc) by capturing the predetermined imaging target using the camera 11, the coordinates are detected with high accuracy, whereas the range where the coordinates can be calculated is limited. Further, in the method of calculating coordinates (the sensor coordinates Ps) using a sensor (the gyro sensor 12), it may be difficult to detect the coordinates with high accuracy, whereas it is possible to calculate the coordinates when the input device 2 is in any attitude. That is, in the exemplary embodiment, coordinates are calculated by two types of methods having different advantages, and the designated position is calculated using two types of sets of coordinates. This makes it possible to calculate the designated position with high accuracy, and also enables the user to perform an input operation by moving the input device 2 freely. That is, it is possible to calculate the designated position with high accuracy using the camera 11, and also possible to enable an input operation using the gyro sensor 12 even when the camera coordinates Pc are not calculated using the camera 11.

It is noted that in the exemplary embodiment, the marker device 5 installed in advance is used as the predetermined imaging target. Thus, in the method of calculating the camera coordinates Pc using the camera 11, the range where the camera coordinates Pc can be calculated is limited. Here, in another exemplary embodiment, the information processing system 1 may calculate the camera coordinates using any target included in the image captured by the camera 11. For example, the information processing system 1 may identify an object included in the captured image by an image recognition process, and may calculate the camera coordinates Pc based on the position (in the captured image) of the identified object. This method makes it possible to calculate the camera coordinates Pc when the input device 2 is in any attitude. However, even if this method is employed, it may not be possible to identify the target because, for example, a recognition process fails, and therefore, it may not be possible to calculate the camera coordinates. Thus, even if this method is employed, similarly to the above exemplary embodiment, the method of calculating the designated position using the camera coordinates and the sensor coordinates is effective.

(2-4: Method of Calculating Sensor Coordinates)

Figure 5:
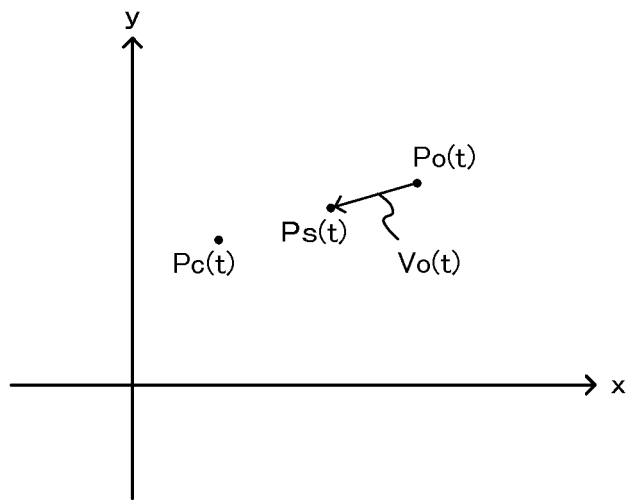
FIG. 5 is a diagram showing a non-limiting example of a method of calculating the sensor coordinates in a case where the camera coordinates are calculated at a certain time t.
Figure 6:
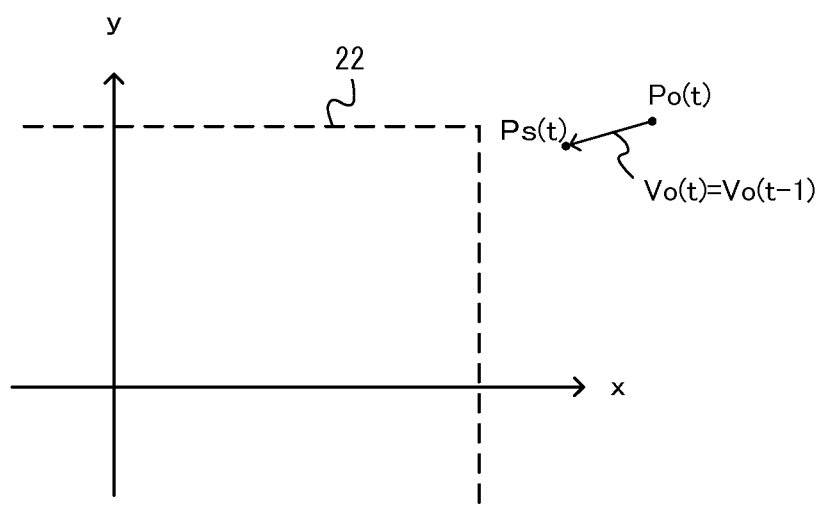
FIG. 6 is a diagram showing a non-limiting example of a method of calculating the sensor coordinates when the camera coordinates are not calculated at the certain time t.

Next, with reference to FIGS. 5 and 6, the method of calculating the sensor coordinates Ps in the exemplary embodiment is described. The information processing system 1 obtains the operation data from the input device 2 once every predetermined time, and calculates the sensor coordinates Ps every time the information processing system 1 obtains the operation data. In the exemplary embodiment, as will be described later, the ultimate sensor coordinates Ps are calculated by correcting the sensor coordinates before being corrected. Details are described below.

FIG. 5 is a diagram showing an example of the method of calculating the sensor coordinates in a case where the camera coordinates are calculated at a certain time t. In the exemplary embodiment, having obtained the operation data, the information processing system 1 calculates camera coordinates Pc (Pc(t) shown in FIG. 5) based on the imaging information included in the operation data. Further, the information processing system 1 calculates sensor coordinates Po (Po(t) shown in FIG. 5) based on the angular velocity information included in the operation data. The sensor coordinates Po are the sensor coordinates before being corrected using the camera coordinates Pc. To distinguish the sensor coordinates Po from the corrected sensor coordinates, the sensor coordinates Po are hereinafter referred to as the "pre-correction sensor coordinates Po". In the exemplary embodiment, as described above, the pre-correction sensor coordinates Po are calculated from the angular velocity information, the imaging information, and the detection result of an acceleration sensor (not shown).

When the camera coordinates Pc and the pre-correction sensor coordinates Po have been calculated, the information processing system 1 calculates an offset Vo (Vo(t) shown in FIG. 5). The offset Vo is a vector indicating the amount of correction (and the direction of correction on the plane) for correcting the pre-correction sensor coordinates Po to obtain the sensor coordinates Ps. Specifically, the offset Vo is calculated in accordance with the following equation (1).

$$Vo(t) = \{Pc(t) - Po(t)\} \cdot A + Vo(t-1) \cdot \{1 - A\} \quad (1)$$

In the above equation (1), a coefficient A is a constant (0<A<1) determined in advance. The coefficient A indicates the degree of influence of reflecting on the offset Vo(t) the difference between the camera coordinates Pc(t) and the pre-correction sensor coordinates Po(t) that have been currently obtained. Further, a variable Vo(t−1) indicates an offset that has been previously calculated (at a time t−1). As shown in the above equation (1), the offset Vo is calculated based on the difference between the camera coordinates Pc and the pre-correction sensor coordinates Po.

When the offset Vo has been calculated, the information processing system 1 corrects the pre-correction sensor coordinates Po using the offset Vo, thereby calculating the sensor coordinates Ps (see FIG. 5). Specifically, the sensor coordinates Ps are calculated in accordance with the following equation (2).

$$Ps(t) = Po(t) + Vo(t) \quad (2)$$

As is clear from FIG. 5 and the above equation (2), the sensor coordinates Ps are obtained by moving the pre-correction sensor coordinates Po (bringing the pre-correction sensor coordinates Po close to the camera coordinates Pc) by the offset Vo.

It is noted that it is understood from the above equation (1) that the offset Vo is a vector directed from the pre-correction sensor coordinates Po toward the camera coordinates Pc (see FIG. 5). That is, it is understood from the above equations (1) and (2) that the offset Vo makes a correction to bring the pre-correction sensor coordinates Po close to the camera coordinates Pc. It is noted that when the previous offset Vo(t−1) is reflected on the current offset Vo(t) as in the exemplary embodiment, if only a single correction is considered, the offset Vo may make a correction to even distance the pre-correction sensor coordinates Po from the camera coordinates Pc. However, the repetition of a correction results in bringing the sensor coordinates Ps close to the camera coordinates Pc. That is, considering that a correction is repeated multiple times, it can be said that the offset Vo according to the exemplary embodiment makes a correction to bring the pre-correction sensor coordinates Po close to the camera coordinates Pc.

It is noted that in the exemplary embodiment, the previous offset Vo(t−1) is reflected on the current offset Vo(t). Alternatively, in another exemplary embodiment, the previous offset Vo(t−1) may not be reflected. That is, in the above equation (1), it may be set such that the coefficient A=1.

Here, in the exemplary embodiment, the determination condition includes the condition that "the camera coordinates Pc and the sensor coordinates Ps are within a predetermined distance from each other". That is, the determination condition is not satisfied unless the camera coordinates Pc and the sensor coordinates Ps come somewhat close to each other. Thus, the process of calculating the designated position using the sensor coordinates Ps is not started. Here, in the exemplary embodiment, the information processing system 1 calculates the pre-correction sensor coordinates Po based on the detection result of the sensor, and brings the calculated pre-correction sensor coordinates Po close to the camera coordinates Pc, thereby calculating the (ultimate) sensor coordinates Ps. This makes it likely that the camera coordinates Pc and the sensor coordinates Ps come close to each other. This makes it likely that the process of calculating the designated position using the sensor coordinates Ps is started. That is, the user can start earlier the input operation that allows the user to move the input device 2 freely.

In addition, in the exemplary embodiment, the camera coordinates Pc and the pre-correction sensor coordinates Po are repeatedly calculated, and the information processing system 1 calculates the amount of correction (the offset Vo) in accordance with the difference between the camera coordinates Pc and the pre-correction sensor coordinates Po (the above equation (1)) every time the camera coordinates Pc and the pre-correction sensor coordinates Po are calculated. Then, a correction is made to bring the pre-correction sensor coordinates Po close to the camera coordinates Pc by the calculated amount of correction. As described above, the use of the amount of correction according to the above difference makes it possible to easily make a correction to bring the pre-correction sensor coordinates Po close to the camera coordinates Pc.

Next, the method is described of calculating the sensor coordinates Ps when the camera coordinates Pc are not calculated. In the exemplary embodiment, the information processing system 1 performs the process of calculating the camera coordinates Pc every time the information processing system 1 obtains the operation data. However, when the camera 11 has not been able to capture the marker device 5 (when the imaging information has been obtained that indicates that the marker device 5 is not included), it is not possible to calculate the camera coordinates Pc. In this case, the sensor coordinates Ps are calculated as follows.

FIG. 6 is a diagram showing an example of the method of calculating the sensor coordinates in a case where the camera coordinates are not calculated at the certain time t. When the camera coordinates Pc have not been calculated at the certain time t, the information processing system 1 corrects the pre-correction sensor coordinates Po using the latest one of the offsets Vo calculated in the past. Specifically, when the camera coordinates Pc have not been calculated, the offset Vo is determined in accordance with the following equation (3) instead of the above equation (1).

$$Vo(t) = Vo(t-1) \quad (3)$$

As in the above equation (3), in the above case, the offset Vo(t−1) that has been previously calculated is used as the current offset Vo. Then, the information processing system 1 calculates the sensor coordinates Ps in accordance with the above equation (2). That is, sensor coordinates Ps(t) are calculated by moving the pre-correction sensor coordinates Po(t) that have been currently calculated, by (the offset Vo(t) equal to) the previous offset Vo(t−1) (see FIG. 6).

As described above, in the exemplary embodiment, when the camera coordinates Pc cannot be calculated, the information processing system 1 does not calculate the amount of correction (an offset), and calculates the sensor coordinates Ps using the pre-correction sensor coordinates Po that have been calculated last (the pre-correction sensor coordinates Po that have been currently calculated) and the amount of correction that has been calculated last (the offset Vo that has been calculated last). Thus, in the exemplary embodiment, even when the camera coordinates Pc are not calculated, the sensor coordinates are corrected. This makes it possible to, even when the camera coordinates Pc are not calculated, bring the sensor coordinates Ps close to the camera coordinates Pc. Further, the sensor coordinates are corrected regardless of whether or not the camera coordinates Pc can be calculated. This makes it possible to prevent the values of the sensor coordinates from changing in accordance with whether or not the camera coordinates Pc can be calculated.

In addition, the information processing system 1 according to the exemplary embodiment, when the camera coordinates Pc have not been calculated in the satisfaction period, calculates the designated position using the sensor coordinates Ps, and when the camera coordinates Pc have been calculated in the satisfaction period, calculates the designated position using the camera coordinates Pc together with the sensor coordinates Ps. As described above, when the camera coordinates Pc have been calculated, the use of the camera coordinates Pc even in the satisfaction period makes it possible to calculate the designated position with high accuracy.

(2-5: Determination Condition)

Next, the determination condition for determining the switching from the unsatisfaction period to the satisfaction period is described. In the exemplary embodiment, the determination condition includes a condition regarding the relationship between the camera coordinates Pc and the sensor coordinates (Ps or Po) (hereinafter referred to as a "relationship condition"). Further, in the exemplary embodiment, the determination condition also includes a condition regarding the reliability of the detection result of the gyro sensor 12 (hereinafter referred to as a "reliability condition"), and a condition regarding the calculation of the camera coordinates (hereinafter referred to as a "camera condition"). Each condition included in the determination condition is described below.

(Relationship Condition)

Figure 7:
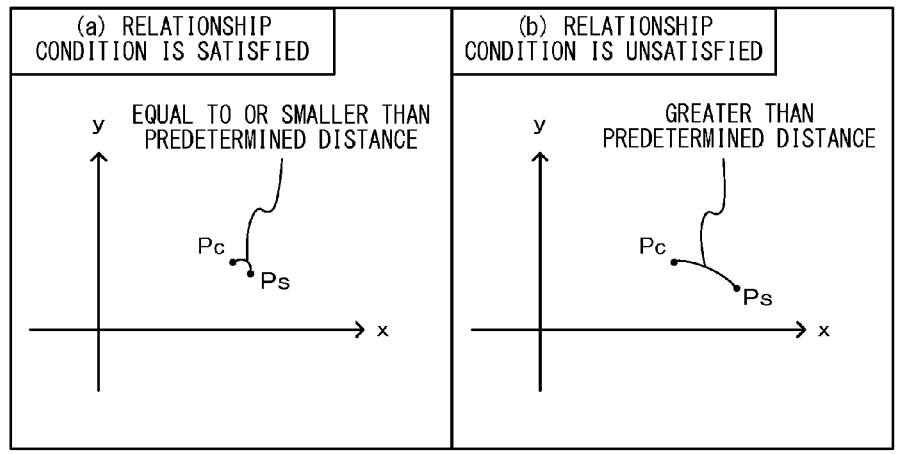
FIG. 7 is a diagram showing non-limiting examples of the camera coordinates and the sensor coordinates in a case where a relationship condition is satisfied and a case where the relationship condition is not satisfied.

FIG. 7 is a diagram showing examples of the camera coordinates and the sensor coordinates in a case where the relationship condition is satisfied and a case where the relationship condition is not satisfied. In the exemplary embodiment, the relationship condition is the condition that the distance between the camera coordinates Pc and the sensor coordinates Ps becomes equal to or smaller than a predetermined distance determined in advance. That is, the information processing system 1 calculates the distance between the camera coordinates Pc and the sensor coordinates Ps, and determines, using the calculated distance, whether or not the relationship condition is satisfied. Thus, as shown in FIG. 7, when the distance between the camera coordinates Pc and the sensor coordinates Ps is equal to or smaller than the predetermined distance, the relationship condition is satisfied. When the distance between the camera coordinates Pc and the sensor coordinates Ps is greater than the predetermined distance, the relationship condition is not satisfied.

As described above, the information processing system 1 may use as the determination condition at least the condition that the distance between the camera coordinates Pc and the sensor coordinates Ps becomes equal to or smaller than a predetermined value. Based on this, the switching from the unsatisfaction period to the satisfaction period is performed at timing when the difference between the camera coordinates Pc and the sensor coordinates Ps is small. The switching may be performed at such timing, whereby it is possible to reduce the possibility that the designated position rapidly changes before and after the switching. This reduces the possibility of giving the user discomfort. This makes it possible to improve the operability of an input operation. Further, it is possible to switch from the unsatisfaction period to the satisfaction period at appropriate timing, and therefore possible to appropriately calculate the designated position.

In addition, it can be said that the relationship condition according to the exemplary embodiment is a condition regarding the distance between the camera coordinates Pc and the sensor coordinates Ps. As described above, when the determination condition includes a condition regarding the above distance, it is possible to determine from the distance whether or not the sensor coordinates Ps have been calculated with as high accuracy as the camera coordinates Pc. This makes it possible to switch from the unsatisfaction period to the satisfaction period at appropriate timing. It is noted that in another exemplary embodiment, as a condition regarding the distance between the camera coordinates Pc and the sensor coordinates Ps, the condition that "the change in distance during a predetermined period is within a certain range" may be used. This also makes it possible to switch from the unsatisfaction period to the satisfaction period at appropriate timing.

In addition, the relationship condition may be not only a condition regarding the above distance but also any condition regarding the relationship between the camera coordinates Pc and the sensor coordinates. For example, in another exemplary embodiment, the relationship condition may be a condition regarding the movements (the manners of moving, such as the moving directions and the amounts of movement) of the camera coordinates Pc and the sensor coordinates Ps. Specifically, the information processing system 1 may calculate the degree of similarity between the behavior (movement trajectory) of the camera coordinates Pc during a predetermined period and the behavior (movement trajectory) of the sensor coordinates Ps during the predetermined period, and may determine whether or not the degree of similarity is equal to or greater than a predetermined value. In this case, when the degree of similarity is equal to or greater than the predetermined value, it may be determined that the relationship condition is satisfied. When the degree of similarity is less than the predetermined value, it may be determined that the relationship condition is not satisfied.

As described above, it can be said that the relationship condition is a condition for determining whether or not the sensor coordinates Ps have been calculated with as high accuracy as the camera coordinates Pc. The switching from the unsatisfaction period to the satisfaction period is determined using such a relationship condition, whereby the sensor coordinates Ps are calculated with high accuracy. Thereafter, the switching from the unsatisfaction period to the satisfaction period is performed. This makes it possible to switch from the unsatisfaction period to the satisfaction period at appropriate timing.

It is noted that in the exemplary embodiment, the sensor coordinates to be used to determine the relationship condition are the corrected sensor coordinates Ps. Alternatively, in another exemplary embodiment, the sensor coordinates may be the pre-correction sensor coordinates Po.

(Reliability Condition)

Next, the reliability condition is described. As described above, the reliability condition is a condition regarding the reliability of the detection result of the gyro sensor 12, and requires the fact that the reliability of the detection result is higher than a predetermined reference. Here, "the reliability of the detection result of the gyro sensor is high" means that a value according to the attitude of the input device 2 calculated from the detection result is highly accurate.

Here, when the input device 2 is being intensely moved, it is difficult to calculate a value according to the attitude of the input device 2 from the detection result of the gyro sensor 12 with high accuracy. Thus, it is possible to guess that the reliability of the detection result of the gyro sensor is low. Thus, in the exemplary embodiment, as the reliability condition, a condition for determining whether or not the input device 2 is being intensely moved is used. Specifically, the information processing system 1 obtains an indicator representing the intensity of the motion of the input device 2 from the operation data, and determines, using the obtained indicator, whether or not the reliability condition is satisfied. As the indicator, for example, a value indicating the amount of correction of the zero point (bias) of the gyro sensor 12 can be used. It is noted that this value can be output from the gyro sensor 12, and obtained as the operation data by the information processing apparatus 3. When the above value is equal to or greater than a predetermined threshold, it is determined that the motion of the input device 2 is relatively intense, and therefore, it is determined that the reliability condition is not satisfied. On the other hand, when the above value is smaller than the threshold, it is determined that the motion of the input device 2 is relatively gentle, and therefore, it is determined that the reliability condition is satisfied.

Figure 8:
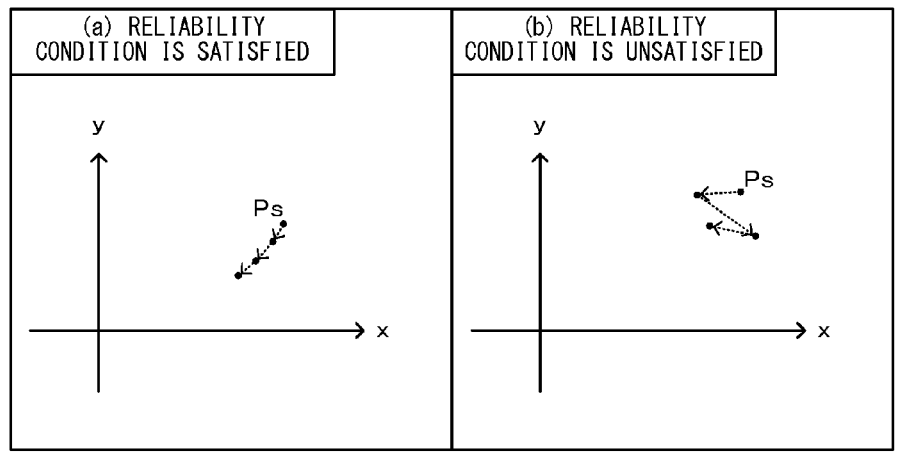
FIG. 8 is a diagram showing non-limiting examples of the behavior of the sensor coordinates in a case where a reliability condition is satisfied and a case where the reliability condition is not satisfied.

FIG. 8 is a diagram showing examples of the behavior of the sensor coordinates in a case where the reliability condition is satisfied and a case where the reliability condition is not satisfied. Typically, as shown in (a) of FIG. 8, when the sensor coordinates Ps change gently, the value of the indicator is equal to or greater than the predetermined threshold. As a result, the reliability condition is satisfied. On the other hand, as shown in (b) of FIG. 8, when the sensor coordinates Ps change rapidly, the value of the indicator is smaller than the predetermined threshold. As a result, the reliability condition is not satisfied. It is noted that FIG. 8 is merely illustrative, and in practice, even when the sensor coordinates Ps change gently, the value of the indicator may be smaller than the predetermined threshold. Further, even when the sensor coordinates Ps change rapidly, the value of the indicator may be equal to or greater than the predetermined threshold.

As described above, in the exemplary embodiment, the predetermined condition includes the reliability condition regarding the reliability of the detection result of the gyro sensor 12. Based on this, when the sensor coordinates calculated from the detection result of the gyro sensor 12 have high accuracy, it is possible to calculate the designated position using the sensor coordinates. Thus, it is possible to improve the accuracy of the calculation of the designated position, and therefore possible to improve the accuracy of an input operation using the input device 2.

In addition, in the exemplary embodiment, the reliability condition is the condition that "the motion of the input device 2 is gentler than a predetermined reference". As described above, the use of the intensity of the motion of the input device 2 makes it possible to determine the reliability with high accuracy.

It is noted that the indicator indicating the intensity of the motion of the input device 2 is not limited to the above. For example, when an acceleration sensor is used as a sensor for calculating the attitude of the input device 2, the detection result (acceleration) of the acceleration sensor may be used as the indicator. That is, when the acceleration is equal to or greater than a predetermined value, the information processing system 1 may determine that the motion of the input device 2 is intense. When the acceleration is less than the predetermined value, the information processing system 1 may determine that the motion of the input device 2 is gentle. Alternatively, in another exemplary embodiment, the amounts of change in the sensor coordinates (or the pre-correction sensor coordinates Po) may be used as the indicator.

(Camera Condition)

The camera condition is a condition regarding the calculation of the camera coordinates. In the exemplary embodiment, the camera condition is the condition that the camera coordinates Pc are calculated (the camera coordinates Pc can be calculated). That is, when the camera coordinates Pc are calculated from the obtained imaging information, the information processing system 1 determines that the camera condition is satisfied. When the camera coordinates Pc cannot be calculated, the information processing system 1 determines that the camera condition is not satisfied. It is noted that in the exemplary embodiment, the relationship condition is determined using the camera coordinates Pc, and the determination of the relationship condition is made on the premise that the camera coordinates Pc are calculated. Thus, the information processing system 1 may not set the camera condition, and when the camera coordinates Pc are not calculated, may determine that the relationship condition is not satisfied.

(Method of Determining Determination Condition)

Next, the method of determining the determination condition is described. In the exemplary embodiment, the condition including the relationship condition, the reliability condition, and the camera condition is defined as a "sub-condition", and the determination condition is the condition that the sub-condition has been satisfied a predetermined number of times (for example, 15 times). That is, every time the sensor coordinates Ps are calculated, the information processing system 1 determines whether or not the sub-condition is satisfied. It is noted that when each of the relationship condition, the reliability condition, and the camera condition is satisfied, it is determined that the sub-condition is satisfied. On the other hand, when any one of the relationship condition, the reliability condition, and the camera condition is not satisfied, it is determined that the sub-condition is not satisfied. Then, when the sub-condition has been satisfied the predetermined number of times, the information processing system 1 determines that the determination condition is satisfied. Thus, the switching from the unsatisfaction period to the satisfaction period is performed.

As described above, in the exemplary embodiment, the information processing system 1 repeatedly determines whether or not the sub-condition is satisfied. When the sub-condition has been satisfied predetermined multiple times (after the start of the process of calculating the designated position), the information processing system 1 determines that the determination condition is satisfied. Thus, in the exemplary embodiment, when the sub-condition has been satisfied a predetermined number of times in total after the calculation of the designated position has been started, the switching from the unsatisfaction period to the satisfaction period is performed. Based on this, even when the sub-condition has been accidentally satisfied only once, the switching from the unsatisfaction period to the satisfaction period is not performed. This makes it possible to reduce the possibility that the designated position is calculated using the sensor coordinates Ps having low accuracy. As a result, it is possible to calculate the designated position with high accuracy, and therefore possible to improve the operability of the input device 2.

In addition, in the above case, it is not necessary that the sub-condition has been satisfied a predetermined number of times in succession. This makes it possible to reduce the possibility that the switching to the satisfaction period is performed too late because the determination condition is too strict. That is, it is likely that the process of calculating the designated position using the sensor coordinates Ps is started. This enables the user to start earlier the input operation that allows the user to move the input device 2 freely.

It is noted that in another exemplary embodiment, when the sub-condition has been satisfied a predetermined number of times in succession (after the calculation of the designated position has been started), the information processing system 1 may determine that the predetermined condition is satisfied. This makes it possible to further reduce the possibility that the designated position is calculated using the sensor coordinates Ps having low accuracy, and therefore possible to calculate the designated position with higher accuracy.

It is noted that in the exemplary embodiment, the determination condition (sub-condition) includes the relationship condition. Alternatively, another exemplary embodiment is not limited to this. For example, in another exemplary embodiment, the determination condition (sub-condition) may not include the relationship condition. That is, the determination condition (sub-condition) may include (only) the reliability condition, or may include (only) the camera condition.

[3. Specific Example of Designated Position Calculation Process]

Figure 9:
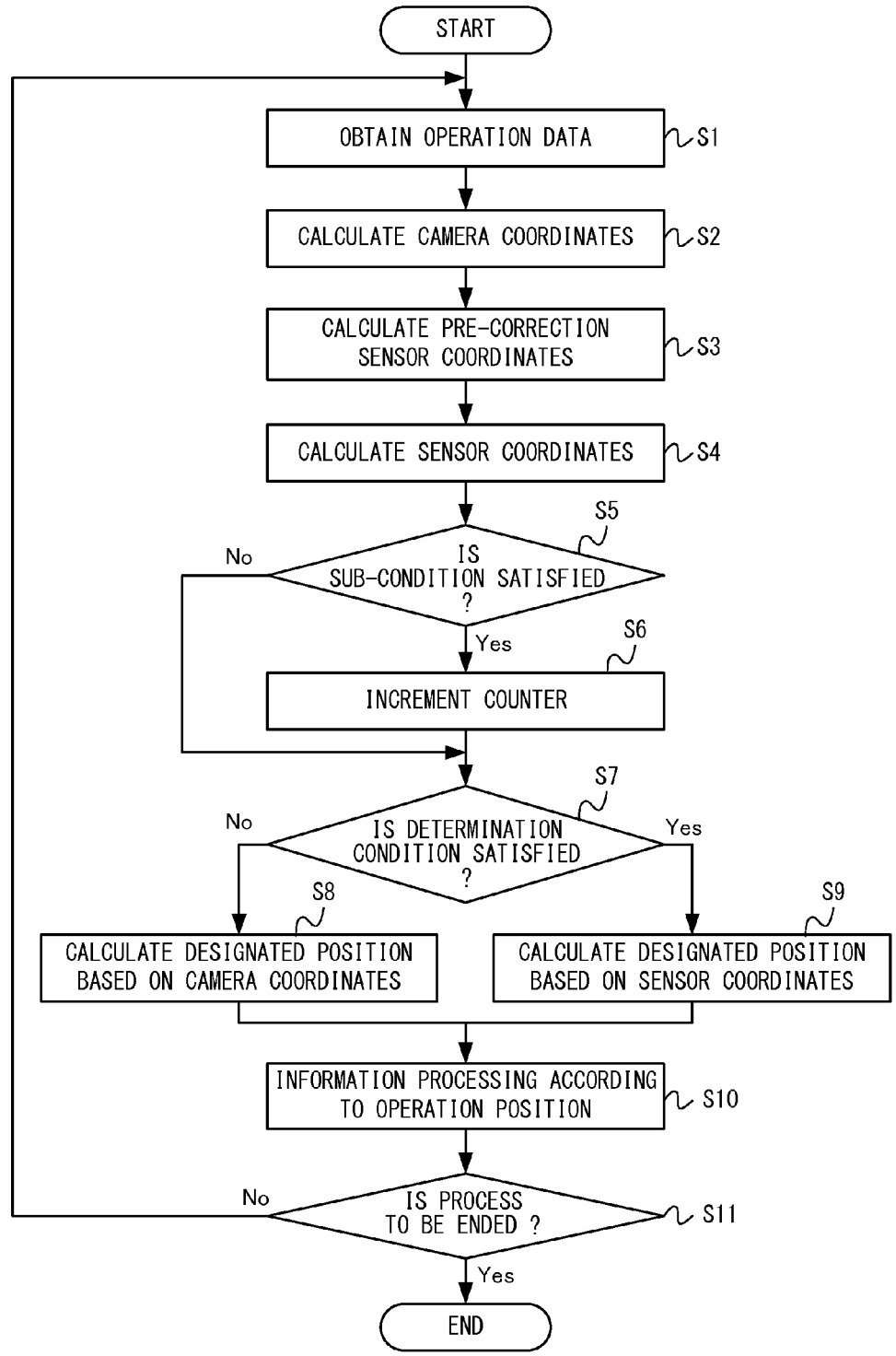
FIG. 9 is a flowchart showing a non-limiting example of the flow of a designated position calculation process performed by an information processing apparatus 3 (a CPU 14) in the exemplary embodiment.

Hereinafter, a specific example of the designated position calculation process performed by the information processing system 1 (the information processing apparatus 3) of the exemplary embodiment will be described. FIG. 9 is a flowchart showing an example of a flow of the designated position calculation process performed by the information processing apparatus 3 (the CPU 14) in the exemplary embodiment. In the exemplary embodiment, a series of processes shown in FIG. 9 are performed by the CPU 14 executing an information processing program stored in the program storage section 16.

The timing at which the designated position calculation process shown in FIG. 9 is started is any timing. In the exemplary embodiment, the information processing program is configured as a part of a predetermined game program. In this case, the designated position calculation process shown in FIG. 9 is started when the user has performed an instruction to start the execution of the game program. In addition, a part or the entirety of the information processing program (game program) is loaded into the memory 12 at appropriate timing, and executed by the CPU 14. Thereby, the series of processes shown in FIG. 9 is started. It is noted that the information processing program has been previously stored in the program storage section 16 in the information processing apparatus 3. However, in another embodiment, the information processing program may be obtained by the information processing apparatus 3 from an attachable/detachable storage medium and stored into the memory 15, or may be obtained from another apparatus via a network such as the Internet and stored into the memory 15.

It is noted that the process of each step in the flowchart shown in FIG. 9 is merely an example, and as long as the same result is obtained, the order of the processes of the respective steps may be changed, or another process may be performed in addition to (or instead of) the process of each step. In addition, in the exemplary embodiment, the CPU performs the process of each step in the flowchart. However, a processor or a dedicated circuit other than the CPU may perform the processes at some of the steps in the flowchart.

In the designated position calculation process, first, in step S1, the CPU 14 obtains the operation data. That is, the CPU 14 receives the operation data including the imaging information, the angular velocity information, and the like from the input device 2, and stores the received operation data into the memory 15. After step S1, the process of step S2 is performed.

In step S2, the CPU 14 calculates the camera coordinates Pc based on the imaging information. In the exemplary embodiment, the camera coordinates are calculated according to the method described above in "2-2: Camera coordinates and sensor coordinates". Specifically, the CPU 14 calculates the camera coordinates Pc based on the imaging information read from the memory 15, and stores data indicating the calculated camera coordinates Pc into the memory 15. After step S2, the process of step S3 is performed.

In step S3, the CPU 14 calculates the pre-correction sensor coordinates Po based on the angular velocity information. In the exemplary embodiment, the pre-correction sensor coordinates Po are calculated in accordance with the method described above in "2-2: Camera coordinates and sensor coordinates" and "2-4: Method of calculating sensor coordinates". Specifically, the CPU 14 calculates the pre-correction sensor coordinates Po based on the angular velocity information read from the memory 15, and stores data indicating the calculated pre-correction sensor coordinates Po into the memory 15. After step S3, the process of step S4 is performed.

In step S4, the CPU 14 calculates the sensor coordinates Ps. In the exemplary embodiment, the sensor coordinates Ps are calculated according to the method described above in "2-2: Camera coordinates and sensor coordinates" and "2-4: Method of calculating sensor coordinates". Specifically, the CPU 14 reads data of the offset Vo that has been previously calculated, the pre-correction sensor coordinates Po, and the camera coordinates Pc (where necessary) from the memory 15, and calculates the sensor coordinates Ps based on the read data. The CPU 14 stores data indicating the calculated sensor coordinates Ps into the memory 15. Further, the CPU 14 stores, into the memory 15, data of the offset Vo calculated when calculating the sensor coordinates Ps. After step S4, the process of step S5 is performed.

In step S5, the CPU 14 determines whether or not the sub-condition is satisfied. This determination is made in accordance with the method described above in "2-5: Determination condition". Specifically, the CPU 14 reads data of the camera coordinates Pc, the sensor coordinates Ps, and the like from the memory 15, and makes the determination using the read data. When the result of the determination in step S5 is positive, the process of step S6 is performed. On the other hand, when the result of the determination in step S5 is negative, the process of step S6 is skipped and the process of step S7 is performed.

In step S6, the CPU 14 increments (adds 1 to) the value of a counter stored in the memory 15. It is noted that the value of the counter is set to 0 at the start of the designated position calculation process. After step S6, the process of step S7 is performed.

In step S7, the CPU 14 determines whether or not the determination condition is satisfied. Specifically, the CPU 14 reads the value of the counter from the memory 15, and determines whether or not the value of the counter has reached a predetermined number of times. When the result of the determination in step S7 is negative, the process of step S8 is performed. On the other hand, when the result of the determination in step S7 is positive, the process of step S9 is performed.

It is noted that in the exemplary embodiment, after the unsatisfaction period has switched to the satisfaction period, the satisfaction period does not return to the unsatisfaction period until the designated position calculation process shown in FIG. 9 ends. Thus, after the unsatisfaction period has switched to the satisfaction period, the CPU 14 may skip the processes of the above steps S5 to S7.

In step S8, the CPU 14 calculates the designated position based on the camera coordinates Pc. In the exemplary embodiment, the designated position is calculated in accordance with the method described above in "2-3: Calculation of designated position". Specifically, the CPU 14 reads data of the camera coordinates Pc from the memory 15, and calculates the designated position based on the read data. It is noted that if camera coordinates Pc are not calculated when the process of step S8 is performed (that is, in the unsatisfaction period), the designated position may not be calculated, or may be calculated using the sensor coordinates Ps. After step S8, the process of step S10 described later is performed.

On the other hand, in step S9, the CPU 14 calculates the designated position based on the sensor coordinates Ps. In the exemplary embodiment, the designated position is calculated in accordance with the method described above in "2-3: Calculation of designated position". Specifically, the CPU 14 reads data of the sensor coordinates Ps from the memory 15, and calculates the designated position based on the read data. After step S9, the process of step S10 is performed.

In step S10, the CPU 14 performs information processing (game processing) according to the designated position. In the exemplary embodiment, as the information processing, the process of displaying a cursor at the designated position is performed. It is noted that the content of the information processing is any content. For example, in another exemplary embodiment, the process of scrolling the screen in accordance with the movement of the designated position may be performed. Alternatively, the process of moving an object such as a player character toward the designated position may be performed. After step S10, the process of step S11 is performed.

In step S11, the CPU 14 determines whether or not the designated position calculation process is to be ended. A specific method for this determination is any method. For example, when the user has performed an instruction to end the execution of the game program, the CPU 14 determines to end the designated position calculation process. When there is no such instruction from the user, the CPU 14 determines not to end the designated position calculation process. When the result of the determination in step S11 is negative, the process of step S1 is performed again. Thereafter, the processes of steps S1 to S11 are repeated until the CPU 14 determines to end the designated position calculation process in step S11. On the other hand, when the result of the determination in step S11 is positive, the CPU 14 ends the designated position calculation process shown in FIG. 9.

It is noted that although not shown in FIG. 9, during the execution of the game program, game processing for advancing a game or the like may be performed in addition to the processes of steps S1 to S11.

[4. Modifications]

(Modification Relating to Use of Camera Coordinates and Sensor Coordinates)

It is noted that in the above exemplary embodiment, the information processing system 1 performs the process of calculating the designated position by switching between the sensor coordinates Ps and the camera coordinates Pc in the satisfaction period and the unsatisfaction period. Here, the use of the sensor coordinates Ps and the camera coordinates Pc is not limited to this. For example, in a modification of the exemplary embodiment, the process of calculating the designated position using the sensor coordinates Ps (in addition to the camera coordinates Pc) in the unsatisfaction period may be performed.

However, also in the above modification, similarly to the above exemplary embodiment, the information processing system 1 calculates the designated position in the satisfaction period by making the influence of the sensor coordinates Ps relatively great as compared to that in the unsatisfaction period. For example, the information processing system 1 may calculate the sensor coordinates Ps in the unsatisfaction period by making the value of the offset Vo smaller than that in the satisfaction period (for example, by multiplying the value of the offset Vo by 0.5), and may calculate the designated position using the thus calculated sensor coordinates Ps. This enables the user to, similarly to the exemplary embodiment, perform an input operation by moving the input device 2 freely in the satisfaction period, and also enables the input operation with high accuracy.

In addition, in the above exemplary embodiment, the sensor coordinates Ps are calculated using the camera coordinates Pc (the above equation (1)), and therefore, it can be said that the designated position is calculated using both the camera coordinates and the sensor coordinates in the satisfaction period. Here, in another exemplary embodiment, the information processing system 1 may calculate the designated position using only the sensor coordinates (without using the camera coordinates) in the satisfaction period. In other words, in the above exemplary embodiment, the designated position may be calculated using the pre-correction sensor coordinates Po instead of the sensor coordinates Ps in the satisfaction period. This also enables the user to, similarly to the exemplary embodiment, perform an input operation by moving the input device 2 freely in the satisfaction period, and also enables the input operation with high accuracy.

(Modification Relating to Value Calculated According to Attitude of Input Device 2)

In the above-mentioned embodiment, the information processing system 1 calculates two types of sets of coordinates (the camera coordinates and the sensor coordinates) each indicating a position on a predetermined plane (the xy plane shown in FIG. 3), as a value according to the attitude of the input device 2. In another embodiment, the information processing system 1 may calculates a value (i.e., a scalar value) indicating a position on a predetermined straight line, as a value according to the attitude of the input device 2. That is, the camera coordinates and the sensor coordinates may be one-dimensional values. For example, the information processing system 1 may calculate a scalar value according to the attitude relating to the pitch direction of the input device 2, and may perform information processing by using the scalar value.

(Modification Relating to Information Processing Performed by Using Each Set of Coordinates)

In the above-mentioned embodiment, as an example of the information processing performed by using the values (the camera coordinates and the sensor coordinates) according to the attitude of the input device 2, the process of calculating the designated position on the plane corresponding to the screen has been described. However, the content of the information processing performed by using the value according to the attitude of the input device 2 is any content. For example, in another embodiment, the information processing may be a process of calculating a position in a virtual space (game space) from the camera coordinates and the sensor coordinates. Further, the information processing may be a process of distinguishing a gesture input based on a trajectory composed of the designated position calculated from the camera coordinates and the sensor coordinates.

(Modification Relating to Calculation of Camera Coordinates)

In the above exemplary embodiment, the camera coordinates are calculated using the imaging information based on an image captured by the imaging means (the camera 11) provided in the input device 2. Here, in another exemplary embodiment, the camera coordinates may be calculated using the imaging information based on an image captured by imaging means for capturing the input device 2 (a camera separated from the input device 2 and arranged at a different position). That is, in the above exemplary embodiment, the camera 11 is provided in the input device 2 held by the user, and the marker device 5 is arranged on the periphery of the television 4. Alternatively, in another embodiment, a marker device may be provided in an input device, and a camera may be arranged at another position (for example, on the periphery of a television). Also in this structure, as in the above embodiment, the information processing apparatus can calculate the positional relationship of the input device with respect to the camera by using imaging information based on an image captured by the camera, and can calculate the camera coordinates according to the attitude of the input device by using the imaging information.

As described above, the exemplary embodiment can be used for, for example, a game apparatus, a game system, a game program, and the like in order, for example, to improve the operability of an input operation of moving an input member.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An apparatus for calculating a designated position on a predetermined plane based on an input provided to an input member, the apparatus comprising:
a processing system, including a computer processor, the processing system being configured at least to perform:
a first position calculation so as to calculate a first position using imaging information based on an image captured by a camera that is provided in the input member or a camera that captures the input member, the first position being a position on the plane and changing in accordance at least with an attitude of the input member;
a second position calculation so as to calculate a second position using a detection result of an attitude sensor, the second position being a position on the plane on which the first position is calculated and according to the attitude of the input member;
a determination so as to determine whether or not a predetermined condition is satisfied, the predetermined condition including a condition that a distance between the first position and the second position is equal to or smaller than a predetermined distance; and
a designated position calculation so as to, when the predetermined condition is not satisfied, calculate a designated position on the plane using the first position and without using the second position, and after the predetermined condition has been satisfied, calculate the designated position on the plane using the second position.

2. The information processing apparatus according to claim 1, wherein:
the attitude sensor includes at least one of a gyro sensor, an acceleration sensor or a magnetic sensor; and
the determination repeatedly determines whether or not the predetermined condition is satisfied, the predetermined condition including the condition that a distance between the first position and the second position is equal to or smaller than the predetermined distance continuously for a predetermined period.

3. A non-transitory computer-readable storage medium having stored therein an information processing program to be executed by a computer of an information processing apparatus for calculating a designated position based on an input provided to an input member, the information processing program causing the computer to execute:
calculating a first position using imaging information based on an image captured by an imaging device that is provided in the input member or captures the input member, the first position being a position on a predetermined plane and changing in accordance at least with an attitude of the input member;
calculating a second position using a detection result of a sensor, the detection result enabling a calculation of the attitude of the input member, the second position being a position on the plane and according to the attitude of the input member;
repeatedly determining whether or not a predetermined condition is satisfied, the predetermined condition including a condition regarding a relationship between the first position and the second position; and
calculating a designated position on the plane using the first position and/or the second position, wherein
in a satisfaction period after the predetermined condition has been satisfied, the designated position is calculated by making an influence of the second position relatively great as compared to an unsatisfaction period before the predetermined condition is satisfied,
the predetermined condition includes at least any of: (a) a condition that a distance between the first position and the second position becomes equal to or smaller than a predetermined value, (b) a condition that a change in the distance between the first position and the second position during a predetermined period is in a predetermined range, or (c) a condition that a degree of similarity between a movement trajectory of the first position and a movement trajectory of the second position is equal to or greater than a predetermined value.

4. The storage medium according to claim 3, wherein
the predetermined condition includes a condition regarding a distance between the first position and the second position.

5. The storage medium according to claim 4, wherein
the condition regarding the distance is the condition that the distance between the first position and the second position becomes equal to or smaller than a predetermined value.

6. The storage medium according to claim 3, wherein
it is repeatedly determined whether or not a sub-condition regarding the relationship between the first position and the second position is satisfied, and
when the sub-condition is satisfied predetermined multiple times, it is determined that the predetermined condition is satisfied.

7. The storage medium according to claim 3, wherein
it is repeatedly determined whether or not a sub-condition regarding the relationship between the first position and the second position is satisfied, and
when the sub-condition has been satisfied a predetermined number of times in succession, it is determined that the predetermined condition is satisfied.

8. The storage medium according to claim 3, wherein the predetermined condition includes a condition regarding a reliability of the detection result of the sensor.

9. The storage medium according to claim 8, wherein the condition regarding the reliability is a condition that a motion of the input member is gentler than a predetermined reference.

10. The storage medium according to claim 3, wherein in the unsatisfaction period, the designated position is calculated using the first position, and in the satisfaction period, the designated position is calculated using the second position.

11. The storage medium according to claim 3, wherein in the unsatisfaction period, the designated position is calculated using the first position and without using the second position, and in the satisfaction period, the designated position is calculated using the first position and the second position.

12. The storage medium according to claim 3, wherein
the second position is calculated based on the detection result of the sensor, and the calculated second position is corrected by bringing the calculated second position close to the first position,
it is determined, using the corrected second position, whether or not the predetermined condition is satisfied, and
the designated position is calculated using the corrected second position.

13. The storage medium according to claim 12, wherein
the first position and the second position before being corrected are repeatedly calculated, and
every time the first position and the second position before being corrected are calculated, an amount of correction is calculated in accordance with a difference between the first position and the second position before being corrected, and the second position before being corrected is corrected by bringing the second position before being corrected close to the first position by the amount of correction.

14. The storage medium according to claim 13, wherein
if the second position is calculated when the first position is not calculated, the second position that has been currently calculated is corrected using the amount of correction that has been calculated last.

15. The storage medium according to claim 3, wherein
the first position is calculated using the imaging information obtained at predetermined timing, and
the second position is calculated using the detection result of the sensor obtained at the same timing as the imaging information.

16. The storage medium according to claim 3, wherein
when the imaging device can capture a predetermined imaging target, the first position is calculated based on a position of the imaging target in an image captured by the imaging device, and
the second position is calculated based on the detection result of the sensor when the input member is in any attitude.

17. An information processing apparatus for calculating a designated position based on an input provided to an input member, the information processing apparatus comprising:
a computer processor configured at least to perform:
a first position calculation so as to calculate a first position using imaging information based on an image captured by an imaging device that is provided in the input member or captures the input member, the first position being a position on a predetermined plane and changing in accordance at least with an attitude of the input member;
a second position calculation so as to calculate a second position using a detection result of a sensor, the detection result enabling a calculation of the attitude of the input member, the second position being a position on the plane and according to the attitude of the input member;
a determination so as to repeatedly determine whether or not a predetermined condition is satisfied, the predetermined condition including a condition regarding a relationship between the first position and the second position; and
a designated position calculation so as to calculate a designated position on the plane using the first position and/or the second position, wherein
in a satisfaction period after the predetermined condition has been satisfied, the designated position calculation calculates the designated position by making an influence of the second position relatively great as compared to an unsatisfaction period before the predetermined condition is satisfied,
the predetermined condition includes at least any of (a) a condition that a distance between the first position and the second position becomes equal to or smaller than a predetermined value, (b) a condition that a change in the distance between the first position and the second position during a predetermined period is in a predetermined range, or (c) a condition that a degree of similarity between a movement trajectory of the first position and a movement trajectory of the second position is equal to or greater than a predetermined value.

18. An information processing system for calculating a designated position based on an input provided to an input member, the information processing system comprising:
a processing system, including a computer processor,the processing system being configured at least to perform:
a first position calculation so as to calculate a first position using imaging information based on an image captured by an imaging device that is provided in the input member or captures the input member, the first position being a position on a predetermined plane and changing in accordance at least with an attitude of the input member;
a second position calculation so as to calculate a second position using a detection result of a sensor, the detection result enabling a calculation of the attitude of the input member, the second position being a position on the plane and according to the attitude of the input member;
a determination so as to repeatedly determine whether or not a predetermined condition is satisfied, the predetermined condition including a condition regarding a relationship between the first position and the second position; and
a designated position calculation so as to calculate a designated position on the plane using the first position and/or the second position, wherein in a satisfaction period after the predetermined condition has been satisfied, the designated position calculation calculates the designated position by making an influence of the second position relatively great as compared to an unsatisfaction period before the predetermined condition is satisfied, the predetermined condition includes at least any of: (a) a condition that a distance between the first position and the second position becomes equal to or smaller than a predetermined value, (b) a condition that a change in the distance between the first position and the second position during a predetermined period is in a predetermined range, or (c) a condition that a degree of similarity between a movement trajectory of the first position and a movement trajectory of the second position is equal to or greater than a predetermined value.

19. A method of calculating a designated position, the method performed in an information processing system for calculating a designated position based on an input provided to an input member, the method comprising:

calculating a first position using imaging information based on an image captured by an imaging device that is provided in the input member or captures the input member, the first position being a position on a predetermined plane and changing in accordance at least with an attitude of the input member;

calculating a second position using a detection result of a sensor, the detection result enabling a calculation of the attitude of the input member, the second position being a position on the plane and according to the attitude of the input member;

repeatedly determining whether or not a predetermined condition is satisfied, the predetermined condition including a condition regarding a relationship between the first position and the second position; and calculating a designated position on the plane using the first position and/or the second position, wherein in a satisfaction period after the predetermined condition has been satisfied, the designated position is calculated by making an influence of the second position relatively great as compared to an unsatisfaction period before the predetermined condition is satisfied, the predetermined condition includes at least any of: (a) a condition that a distance between the first position and the second position becomes equal to or smaller than a predetermined value, (b) a condition that a change in the distance between the first position and the second position during a predetermined period is in a predetermined range, or (c) a condition that a degree of similarity between a movement trajectory of the first position and a movement trajectory of the second position is equal to or greater than a predetermined value.

* * * * *